US005529488A

United States Patent [19]

Jensen

[11] Patent Number: 5,529,488

[45] Date of Patent: Jun. 25, 1996

[54] KILN CAR

[75] Inventor: Niels L. Jensen, Bryan, Tex.

[73] Assignee: Norton Chemical Process Products Corp., Worcester, Mass.

[21] Appl. No.: 502,711

[22] Filed: Jul. 14, 1995

[51] Int. Cl.[6] .................. F27D 3/12; B60P 1/04

[52] U.S. Cl. .................. 432/241; 298/35 R; 414/398

[58] Field of Search .................. 432/241; 298/29, 298/30, 31, 33, 35 R; 414/398

[56] References Cited

U.S. PATENT DOCUMENTS

| | | | |
|---|---|---|---|
| 1,022,562 | 4/1912 | Shepherd | 298/33 |
| 1,636,073 | 7/1927 | Robertson | 432/241 |
| 1,705,704 | 3/1929 | Baker | 432/241 |
| 1,822,795 | 9/1931 | Armington | 298/35 R |
| 3,242,878 | 3/1966 | Floehr | 298/30 |
| 3,759,661 | 9/1973 | Barsby | 432/241 |
| 4,330,267 | 5/1982 | Wood | 432/241 |
| 5,122,055 | 6/1992 | Yamaguchi | 432/241 |

*Primary Examiner*—Thomas N. Moulis
*Attorney, Agent, or Firm*—David Bennett

[57] ABSTRACT

An improved kiln car comprises a car with a load box with a base that can be separated into parts that can be reconfigured to form a discharge and then rotated to reform the base but with the load-bearing side on the underside so as to present a clean side to the next load of green items to be fired and to counter the cumulative effects of distortion as the load bearing base makes repeated passes through the kiln.

5 Claims, 7 Drawing Sheets

KILN CAR

BACKGROUND OF THE INVENTION

The present invention relates to kiln cars used to fire ceramic items in a furnace such as a tunnel kiln. Ceramic items are usually molded in the "green" state with sufficient structural integrity to withstand moderate handling and then fired to produce the finished ceramic item. For many applications the uniformity of the physical properties of the items fired is extremely important and in practice this means that each item should experience essentially the same thermal exposure in terms of time and temperature. Since many of the items to be fired are relatively small, it is not practical to fire each individually and kiln cars have been designed to carry batches of green items into the kiln for firing. These cars typically comprise a box into which the items are loaded and a support chassis on which the box is mounted and moved into and out of the kiln, perhaps on a fixed rail system.

The box portion of the car is typically made from ceramic plates or blocks supported in a suitable manner. The plates are usually made from a ceramic capable of withstanding the temperatures encountered in the kiln and the repeated thermal cycling involved in moving items into and out of the kiln. Where a supporting framework is used this can be in form of a frame in which the plates sit or the supports may be provided by a plurality of posts or pillars which support the plates at their corners such that up to four are supported on each post. The ceramic blocks that provide the sides and the bottom of the box are more usually made of a relatively cheap ceramic. However such ceramics may be subject to plastic deformation at the high temperatures in the kiln and eventually become so badly distorted that they have to be replaced. While such blocks are cheap relative to the framework materials, they are not inexpensive. In addition the kiln car must be taken out of service while it is being reconstructed and this necessarily involves commercial penalties. Therefore anything that prolongs the life of a kiln car while improving the uniformity of the products fired therein and the ease of handling of the items before and after firing, would be very significant from a technical as well as commercial viewpoint. The present invention meets both these objectives.

In one aspect, the present invention relates primarily to the design of the box structure in which the green items are carried which allows the box to have a prolonged useful life and facilitates loading and unloading operations.

Another aspect of the invention provides a means of loading and unloading kiln cars which ensures minimum handling damage, uniform thermal exposure to the items fired and an enhanced durability of the car.

DESCRIPTION OF THE INVENTION

The present invention provides a kiln car comprising a support chassis and a box wherein the box comprises removable side members and a base comprising a frame structure supporting a plurality of ceramic plates, said base being adapted to be separable into at least two sections which are rotatable with respect to one another so as to provide at least one V-shaped channel, and further rotatable to restore the box configuration with the difference that the plates comprising the base have been inverted from their pre-rotation configuration.

The rotation of the frame sections permits the fired materials to be slid onto a conveyor device carrying them away from the car without waiting for the temperature to fall to a point at which the car can be unloaded using conventional techniques. The further rotation to invert the plates has a very beneficial effect. When the base plates pass into the furnace laden with the green items to be fired, they are raised to a temperature at which some degree of plastic flow may be anticipated, particularly if the load is heavy. This can lead to a plate that is so bowed by successive passages through the kiln that the base loses its structural integrity. By inverting the plates before the next load is charged in to the car, the direction of distortion upon firing is reversed such that the previous distortion is, in effect, corrected. As a result the plates can be expected to have a much longer useful life than plates that always present the same surface to the green items to be fired.

Additionally any residue left in the box after firing drops out when the plates are inverted such that the box is less likely to be a source of contamination to subsequent loads charged in to the box.

The base is preferably made up of rectangular plates that lie in contiguous relationship to make up a rectangular base for the box but without a separate confining structure. Other plate shapes and configurations are possible of course without departing from the idea that the plates form a base without significant gaps between them but with no confining structure while the box is in contact with the chassis. In the preferred structure the plates are supported on a plurality of pillars, each plate being supported on a post at each of its four corners, (for a rectangular plate). When the box is removed from the chassis, it is supported upon lifters that pass beneath the base from two opposed sides of the box and hold the plates in place as the box is moved. These lifters are preferably provided with retainer devices that can be activated when the base is separated into at least two parts to allow the fired items to slide through a channel between the separated parts and on to a collector device such as a conveyor. These retainer devices can take the form of retractable projections that line the edges of the parts into which the base is separated. When the parts are tilted these hold the plates together and prevent them separating. They also help to maintain the parts together while the parts are inverted prior to replacing the base on the support posts when the box is re-formed. The retainer devices are preferably adapted to allow the base to separate lengthwise into two equal halves with a channel between when the parts are tilted inwardly.

Where a frame is used it is in general preferred that the frame separates in to equal pieces dividing the base lengthwise in to two equal halves separated by a channel through which fired items supported on the base can be allowed to fall on to a collecting surface such as conveyor. Obviously however it would be possible to provide for a plurality of such removal mechanisms providing a plurality of discharge channels located between opposed pairs of tilted base plates separated at the bottom by a suitable distance to provide the discharge channels.

It is also a preferred feature of this invention that, when the box is separated from the support chassis to be moved under a loading point of a device such as a conveyor, it is supported on sensing devices such as load cells which monitor the weight of the green items in the box at all points. With such an arrangement the box can be moved responsive to the sensors to ensure that the box is uniformly loaded before it is passed into the kiln.

The separability of the box also assists in the discharge operation. In this the box is removed from the support chassis and located directly above a receiving surface, such as a conveyor belt. When the plates are separated the fired items fall a relatively short distance through discharge channels between the separated plates and on to the conveying surface without need for external handling.

As will be appreciated from the above, the entire loading and unloading process can be automated with the result that process variations can be reduced and handling damage minimized.

DRAWINGS

The operation of a preferred embodiment of the invention is illustrated in the drawings in which FIGS. 1–5 are schematic side elevations showing the various stages in loading and unloading the kiln car. FIG. 6 is a top view of the box and FIGS. 7 and 8 are respectively side and end views of the kiln car.

DESCRIPTION OF PREFERRED EMBODIMENTS

The invention is now more fully described with reference to the Drawings.

FIG. 1 shows a kiln car comprising a box, 1, supported on a chassis, 2, moved into its initial loading point position below a feed conveyor, 3. The box comprises a base, 4, and side plates, 5, held in place by end traps, 6. The box is supported on pillars, 7, which form part of the chassis which in turn is able to move along rails, 8, on wheels, 9. The conveyor, 3, bears green product, 10, for loading into the box.

FIG. 2 shows the box of the kiln car removed from the chassis and raised in the direction of the arrows to a position to receive green items ready for firing from the conveyor. The box is supported on a series of arms, (not shown), bearing load cells which register the weight of items loaded at each point in the box. The arms pass under the base from either side of the box and provide individual support for all the plates during the movement to and from the conveyor. The arms may also be provided with retaining devices that line the sides of the base to provide further assistance in maintaining structural integrity of the box during the movement.

Figure 1:
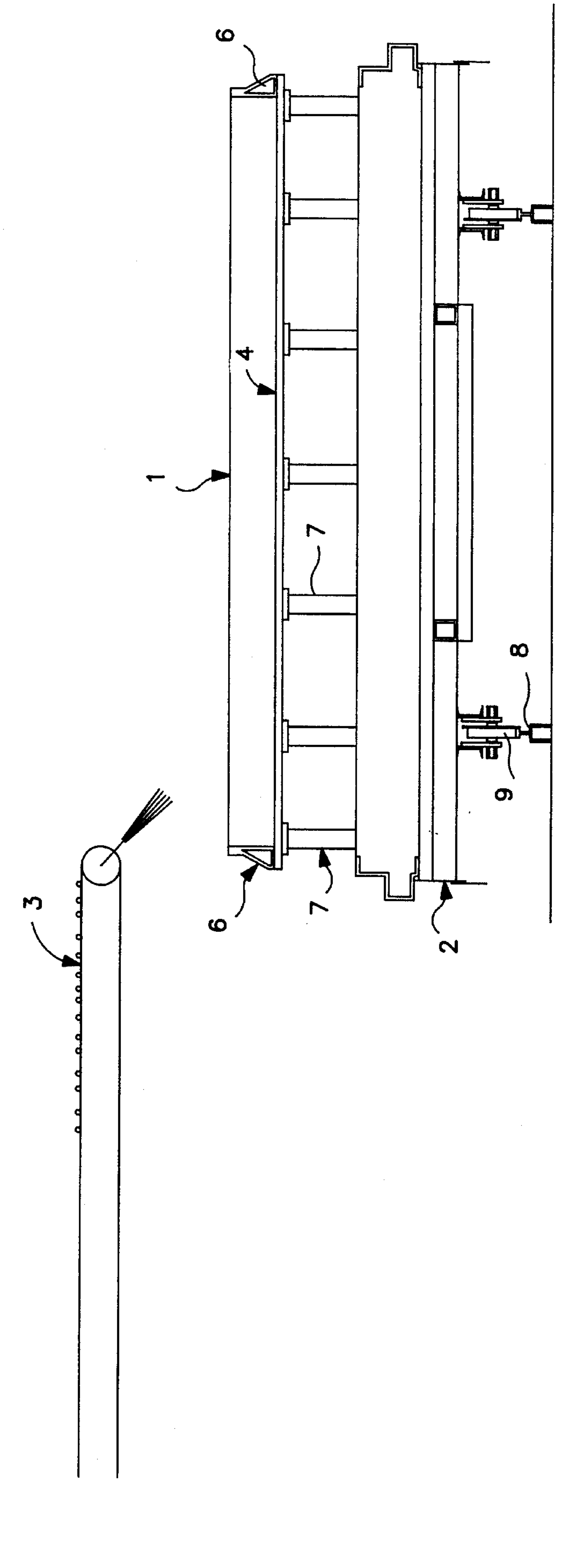
Figure 2:
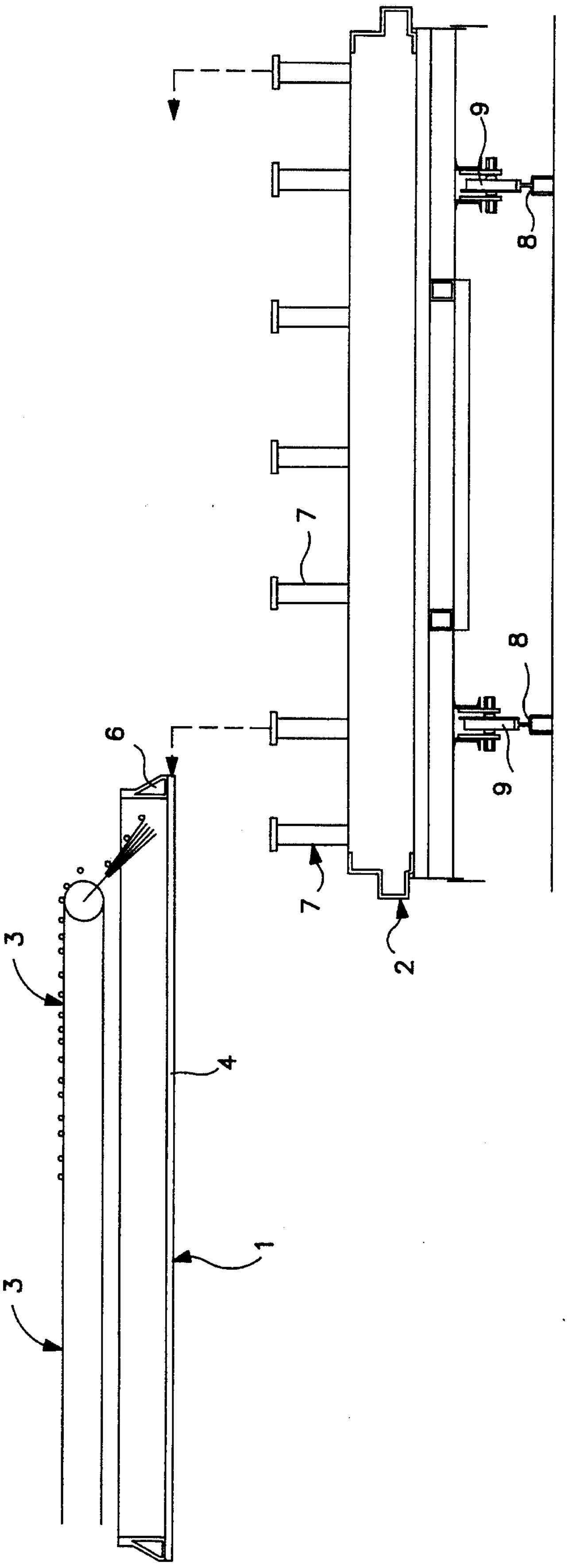
Figure 3:
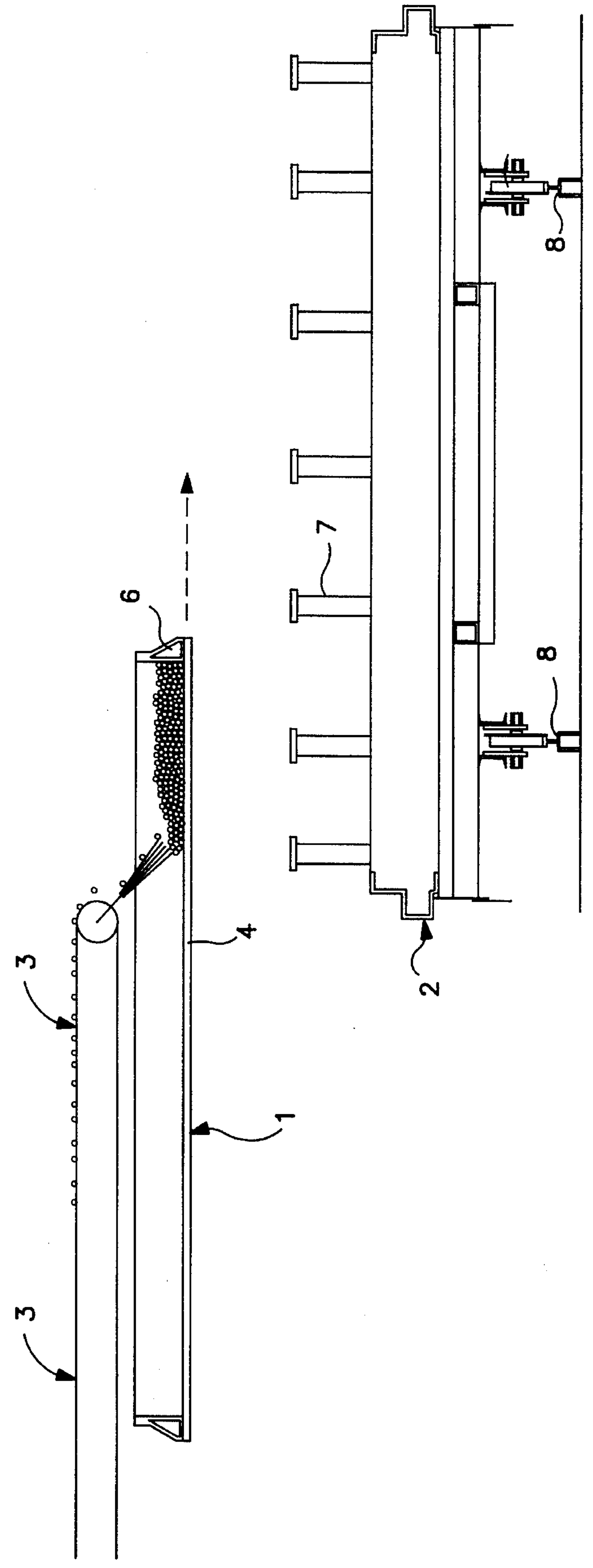
FIG. 3 shows green items being loaded into the box which is moved as filling proceeds in the direction of the arrows, and optionally also at right angles to this direction, in response to readings from the load cells to ensure a uniform loading of the box.
Figure 4:
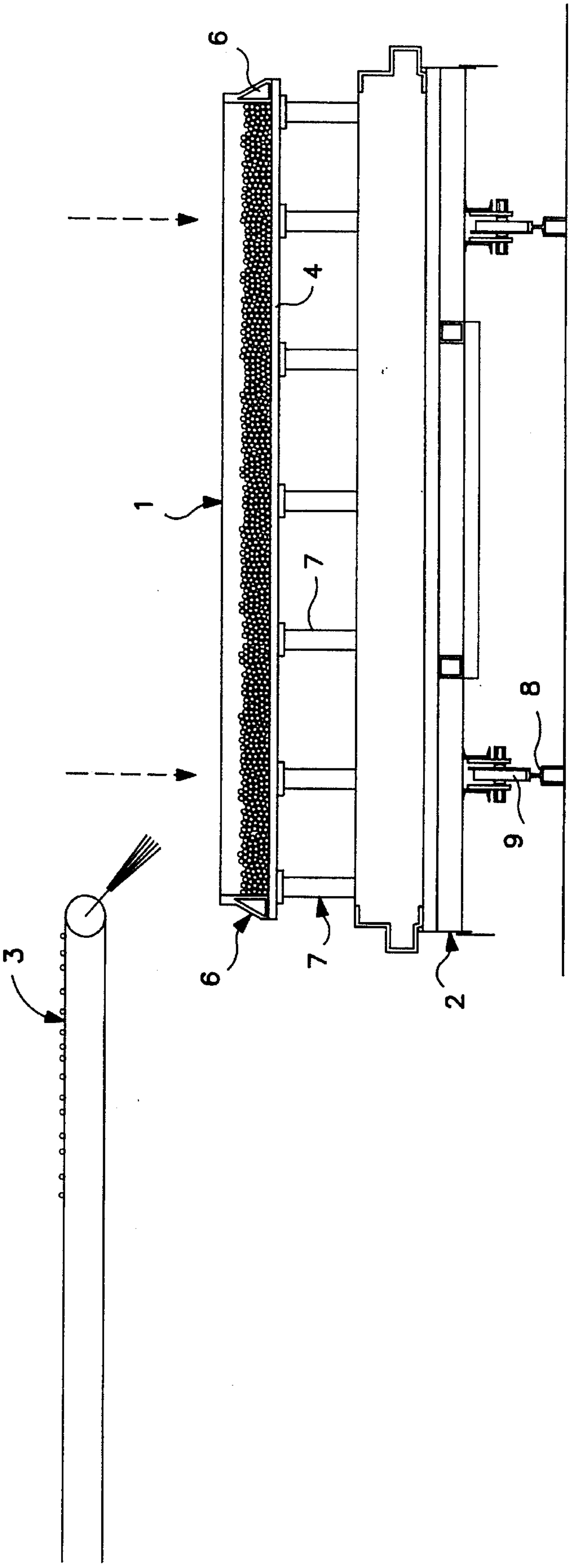
FIG. 4 shows the filled box replaced back on the chassis of the car ready for entry into a furnace, not shown, for firing.
Figure 5:
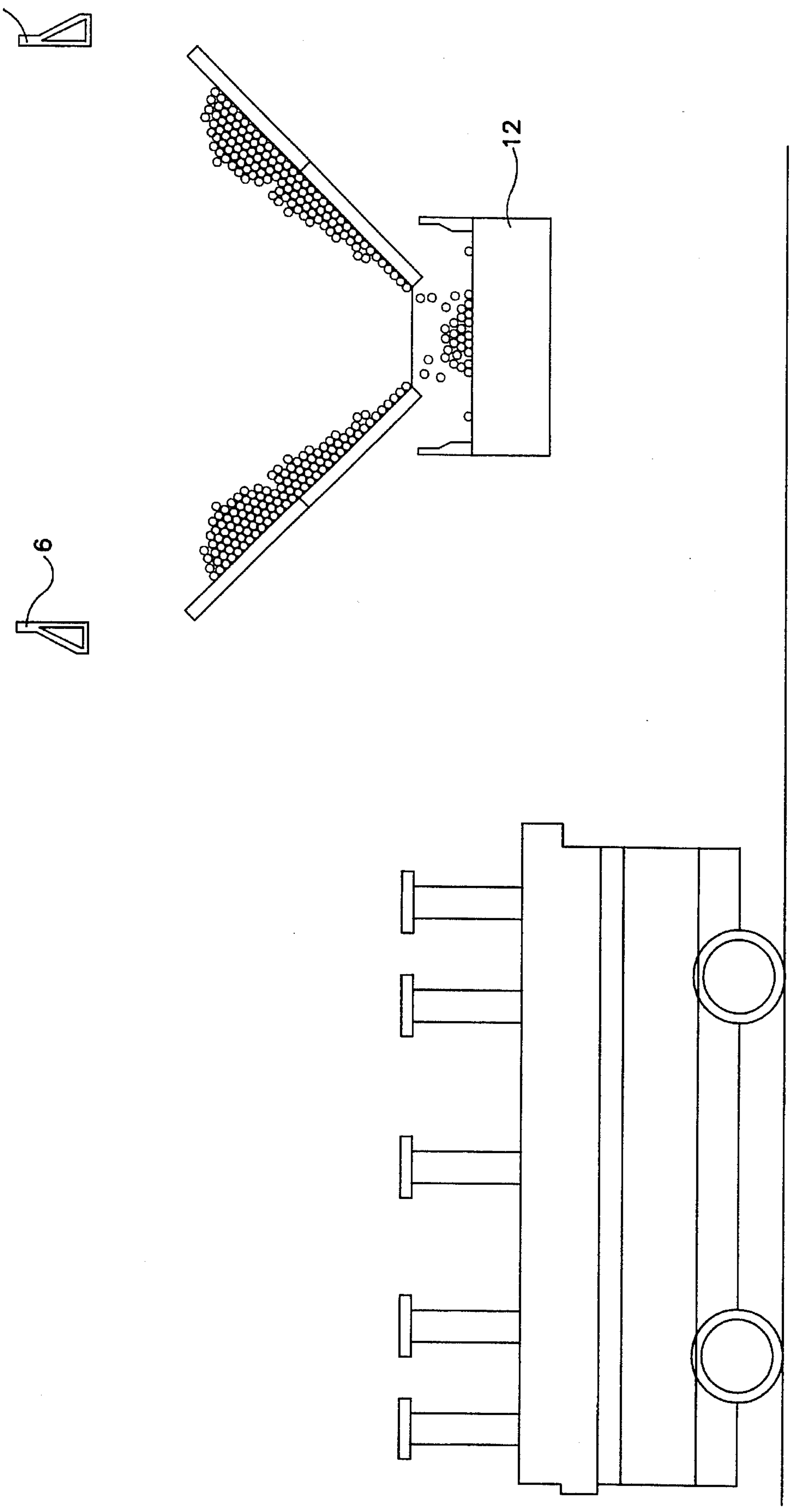

FIG. 5 shows the kiln car after the firing with the box removed from the chassis with the base supported on a second pair of support arms passing under the base similar to the ones used during the loading phase. The box is placed in position over an unloading conveyor, 12. The box has also been dismantled by removal of the side plates, (not shown), and the end traps, 6. The base has been separated into two sections with retaining means, (not shown), retaining the halves of the base in position as they tilt inwardly so as to deposit the fired items on to the unloading conveyor through a discharge channel between the halves.

Figure 6:
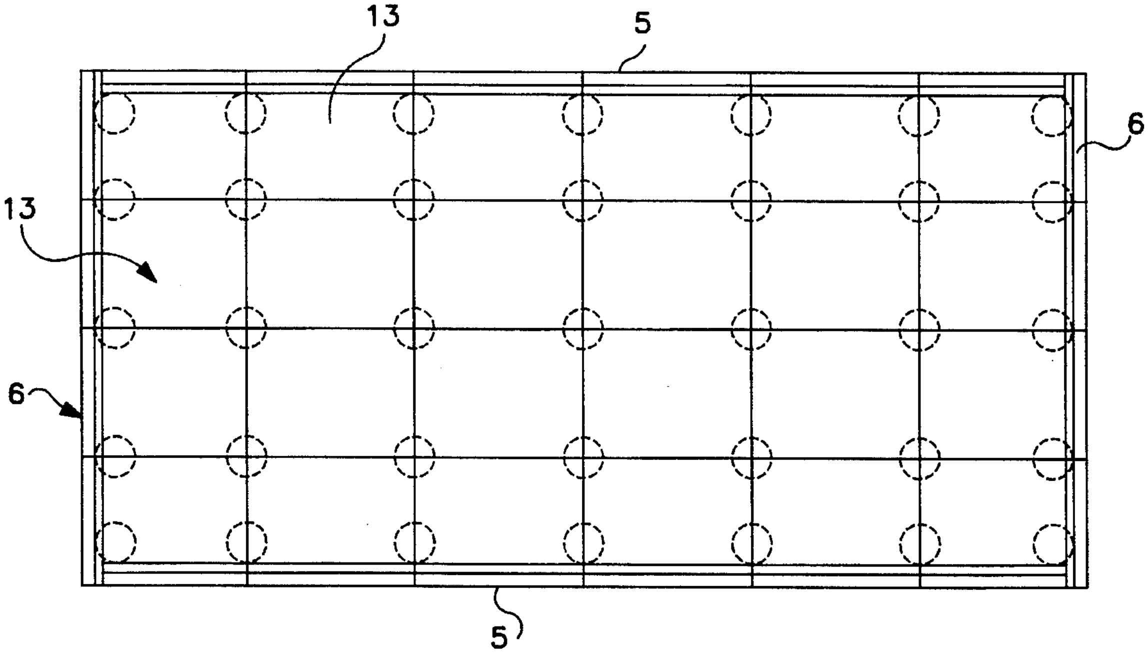
Figure 8:
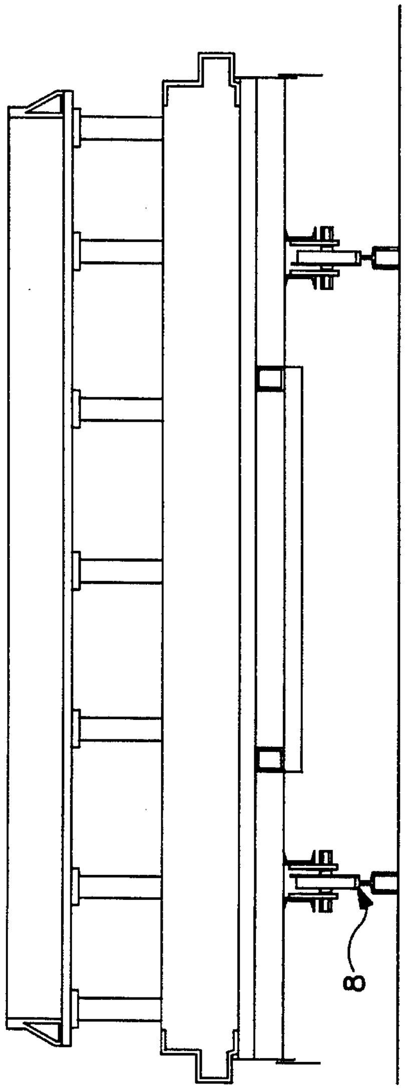
Figure 7:
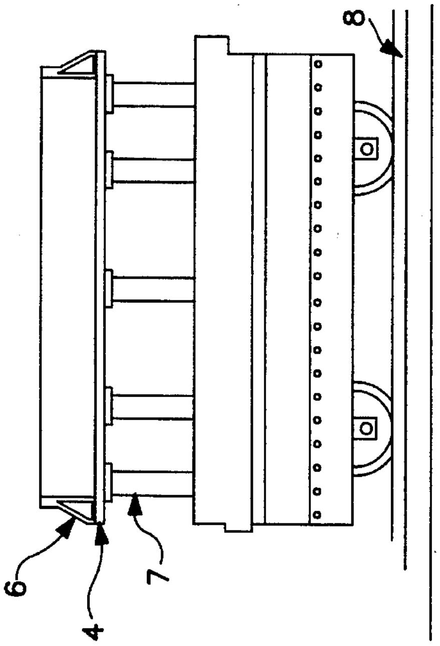

FIG. 6 shows a top view which clearly demonstrates the construction of the base of the box which is rectangular and is made up of 24 similar rectangular plates, 13. The base is bounded on the long sides by side plates, 5, held in place by end traps, 6. The base is supported on a series of posts, 7, while on the chassis.

After unloading of the fired items is completed, the two halves of the base plate are flipped over and replaced on the pillars of the chassis so that the face on which the fired items were carried is now the underside of the box. The side plates are then installed and locked in place by the end blocks thus reconstituting the kiln car ready for re-loading with items to be fired.

The box has been shown with the base plates separating into two equal parts lengthwise down the car. This is not essential since the objective is simply to unload the items in a uniform way with minimal mutual abrasion. This could also be achieved by splitting the base to provide three discharge gaps across the width of the box between first and second, third and fourth, and fifth and sixth rows of plates respectively.

In addition there are many other equivalent structural arrangements by which the objectives achieved by the structure described above could be attained. For example the base plates could be flipped over individually and manually or in the form of the complete base. The base could be arranged to be made of interlocking plates that, once locked in position, provide a base with inherent structural stability such that a system of support posts or a support frame is not needed. The base could also be made from more or fewer plates providing it can be separated into at least two portions separated by at least one discharge channel. It is intended that all such structures be embraced within the scope of this invention.

What is claimed is:

1. A kiln car comprising a support chassis and a box wherein the box comprises a base comprising a plurality of ceramic plates, said base being adapted to be separable into at least two sections which are rotatable with respect to one another so as to provide at least one V-shaped discharge channel, and further rotatable to reform the base of the box with the difference that at least some of the plates comprising the base have been inverted from their pre-rotation configuration.

2. A kiln car according to claim 1 in which the base of the box is rectangular and splits lengthwise into two equal halves with the discharge channel along the center line of the base.

3. A kiln car according to claim 1 in which all plates forming the base are invertible.

4. A kiln car according to claim 1 comprising box having a base comprising a plurality of rectangular plates which are rotatable in two groups of equal area; side plates; and end blocks retaining the side plates in position.

5. A kiln car according to claim 1 in which the base of the box comprises interlocking plates and has inherent structural rigidity but which is separable into at least two rigid portions separated by a discharge channel.

* * * * *